(12) United States Patent
Xu et al.

(10) Patent No.: US 10,539,211 B2
(45) Date of Patent: Jan. 21, 2020

(54) TWO ROTATIONAL AND ONE TRANSLATIONAL DEGREES OF FREEDOM PARALLEL MANIPULATOR WITH HIGH ROTATIONAL CAPABILITY

(71) Applicant: Zhejiang Sci-Tech University, Hangzhou, Zhejiang Province (CN)

(72) Inventors: Lingmin Xu, Hangzhou (CN); Qinchuan Li, Hangzhou (CN); Wei Ye, Hangzhou (CN)

(73) Assignee: Zhejiang Sci-Tech University (CN)

( * ) Notice: Subject to any disclaimer, the term of this patent is extended or adjusted under 35 U.S.C. 154(b) by 205 days.

(21) Appl. No.: 15/741,430

(22) PCT Filed: Mar. 23, 2017

(86) PCT No.: PCT/CN2017/077780
§ 371 (c)(1),
(2) Date: Jan. 2, 2018

(87) PCT Pub. No.: WO2018/076601
PCT Pub. Date: May 3, 2018

(65) Prior Publication Data
US 2018/0372196 A1    Dec. 27, 2018

(30) Foreign Application Priority Data

Oct. 25, 2016  (CN) .......................... 2016 1 0934656

(51) Int. Cl.
| | | |
|---|---|---|
| *B25J 17/00* | (2006.01) | |
| *B25J 17/02* | (2006.01) | |
| *B25J 18/00* | (2006.01) | |
| *F16H 21/54* | (2006.01) | |
| *B25J 9/00* | (2006.01) | |

(52) U.S. Cl.
CPC .............. *F16H 21/54* (2013.01); *B25J 9/003* (2013.01)

(58) Field of Classification Search
CPC ....... B25J 17/0266; B25J 9/0051; B25J 9/003
See application file for complete search history.

(56) References Cited

U.S. PATENT DOCUMENTS

| | | | | |
|---|---|---|---|---|
| 3,633,764 A | * | 1/1972 | Nordmann | ................ B25J 9/003 414/733 |
| 6,896,473 B2 | * | 5/2005 | Schuler | ................ B25J 17/0266 403/109.1 |
| 2008/0202274 A1 | * | 8/2008 | Stuart | ....................... B25J 9/106 74/490.02 |

* cited by examiner

*Primary Examiner* — Jake Cook
(74) *Attorney, Agent, or Firm* — PROI Intellectual Property US

(57) ABSTRACT

Disclosed is a two-turn-one-movement parallel mechanism with a large turning angle, comprising a machine frame, a movable platform, a first branch and two second branches, characterized in that the first branch comprises a machine frame turning pair, a first moving pair slider, a first moving pair guide rod and a first universal joint; each one of the second branches comprises a second moving pair guide rail, a second moving pair slider, a second universal joint, a connecting rod and a movable platform turning pair; in the two second branches, the axis of the first turning pair of each one of the second universal joints is superimposed with and parallel to the axis of the machine frame turning pair in the first branch, and the axis of each one of the movable platform turning pairs is parallel to the second turning axis of the first universal joint in the first branch.

8 Claims, 4 Drawing Sheets

TWO ROTATIONAL AND ONE TRANSLATIONAL DEGREES OF FREEDOM PARALLEL MANIPULATOR WITH HIGH ROTATIONAL CAPABILITY

CROSS REFERENCE TO RELATED APPLICATIONS

The present application is the US national stage of International Patent Application PCT/CN2017/077780 filed on Mar. 23, 2017, which, in turn, claims priority to Chinese Patent Application CN 201610934656.X filed on Oct. 25, 2016.

BACKGROUND OF THE INVENTION

Technical Field

The present disclosure relates to the technical field of robots, specifically to a two-turn-one-movement parallel mechanism with a large turning angle.

Description of the Related Art

A parallel mechanism has the main feature of a movable platform that is connected to a machine frame through more than two branches, and usually the number of branches is equal to the number of degrees of freedom of the mechanism. Motors that drive the mechanism to move can all be installed close to the machine frame such that the mechanism has the advantages of high rigidity, large bearing capacity, high dynamic performance, etc. Therefore, the parallel mechanisms have been widely researched, and the parallel mechanisms with the spatial two-turn-one-movement degree of freedom are a major type and can be applied to fields such as complicated curve surface processing and motion simulation.

Existing two-turn-one-movement parallel mechanisms (CN 105904436 A, CN 104889978 A, CN 105397797 A) usually have ball pairs in branched chains. The ball pairs have a relatively small turning scope, so the whole parallel mechanism also has a relatively small turning angle, thus limiting the application of the mechanism. Therefore, it is very necessary to provide a two-turn-one-movement parallel mechanism with a simple structure and a large turning angle.

BRIEF SUMMARY OF THE INVENTION

The technical problem to be solved by the present disclosure is to provide a two-turn-one-movement parallel mechanism with a large turning angle to overcome the defects in prior art. The parallel mechanism has the advantages of a large turning angle, simple structure, high rigidity, large bearing capacity, and high dynamic performance.
The technical solution of the present disclosure is as follows.

A two-turn-one-movement parallel mechanism with a large turning angle includes a machine frame, a movable platform, and a first branch, and two second branches that are connected between the machine frame and the movable platform in parallel, characterized in that, the first branch includes a machine frame turning pair, a first moving pair slider, a first moving pair guide rod and a first universal joint that are connected between the machine frame and the movable platform in turn; the axis of a first turning shaft, in connection with the first moving pair guide rod, of the first universal joint is parallel to the axis of the machine frame turning pair and vertical to the axis of the first moving pair;

each one of the second branches includes a second moving pair guide rod, a second moving pair slider, a second universal joint, a connecting rod and a movable platform turning pair, wherein the axis of a first turning shaft of each one of the second universal joints is parallel to the axis of each corresponding one of the second moving pairs, the axis of a second turning shaft, in connection with each corresponding one of the connecting rods, of each one of the second universal joints is parallel to the axis of each corresponding one of the movable platform turning pairs and vertical to the axis of each corresponding one of the second moving pairs;

the axis of the first turning pair of each one of the second universal joints in the two second branches is superimposed with and parallel to the axis of the machine frame turning pair in the first branch; and the axis of each one of the movable platform turning pairs in the two second branches is parallel to the axis of the second turning shaft of the first universal joint in the first branch.

A two-turn-one-movement parallel mechanism with a large turning angle includes a machine frame, a movable platform, and two first branches and one second branch that are connected between the machine frame and the movable platform in parallel, characterized in that, each one of the first branches includes a machine frame turning pair, a first moving pair slider, a first moving pair guide rod and a first universal joint that are connected between the machine frame and the movable platform in turn; the axis of a first turning shaft, in connection with each corresponding one of the first moving pair guide rods, of each one of the first universal joints is parallel to the axis of each one of the machine frame turning pairs and vertical to the axis of each one of the first moving pairs;

each one of the second branches includes a second moving pair guide rod, a second moving pair slider, a second universal joint, a connecting rod and a movable platform turning pair, wherein the axis of a first turning shaft of each one of the second universal joints is parallel to the axis of each corresponding one of the second moving pairs, the axis of a second turning shaft, in connection with each corresponding one of the connecting rods, of each one of the second universal joints is parallel to the axis of each corresponding one of the movable platform turning pairs and vertical to the axis of each corresponding one of the second moving pairs;

the axis of a second turning shaft, in connection with the movable platform, of each one of the first universal joints in the two first branches is superimposed with and parallel to the axis of the movable platform turning pair in the second branch; and the axis of a first turning pair of the second universal joint in the second branch is parallel to the axis of each one of the machine frame turning pairs in the first branch.

A two-turn-one-movement parallel mechanism with a large turning angle includes a machine frame, a movable platform, and two first branches, and two second branches that are connected between the machine frame and the movable platform in parallel, characterized in that, each one of the first branches includes a machine frame turning pair, a first moving pair slider, a first moving pair guide rod and a first universal joint that are connected between the machine frame and the movable platform in turn; the axis of a first turning shaft, in connection with each corresponding one of the guide rods, of each one of the first universal joints is parallel to the axis of each one of the machine frame turning pairs and vertical to the axis of each one of the first moving pairs;

each one of the second branches includes a second moving pair guide rod, a second moving pair slider, a second universal joint, a connecting rod and a movable platform turning pair, wherein the axis of a first turning shaft, in connection with each corresponding one of the second moving pair sliders, of each one of the second universal joints is parallel to the axis of each one of the second moving pairs, the axis of a second turning shaft, in connection with each corresponding one of the connecting rods, of each one of the second universal joints is parallel to the axis of each one of the movable platform turning pairs and vertical to the axis of each one of the moving pairs;

the axis of the first turning pair of each one of the second universal joints in the two second branches is superimposed with and is parallel to the axis of each one of the machine frame turning pairs in the first branches; the axis of each one of the second turning shafts, in connection with the movable platform, of each one of the first universal joints in the two first branches is superimposed with and parallel to the axis of each corresponding one of the movable platform turning pairs in the second branches;

and the machine frame turning pairs of the two first branches are arranged symmetrically to the axis of each one of the second moving pairs of the two second branches.

The machine frame turning pair is formed through cooperation between rotating shafts on the first moving pair sliders and a first bearing base and a second bearing base In the two second branches, one of the correcting rods passes through a long hole on the other one of the connecting rods such that the two second branches are arranged in a crossed way; and the long hole is formed along the lengthwise direction of the correcting rod.

In the two second branches, one of the correcting rods passes through a long hole on the other one of the connecting rods such that the two second branches are arranged in a crossed way; and the long hole is formed along the lengthwise direction of the correcting rod.

The present disclosure has the following beneficial effects:

The parallel mechanism put forward by the present disclosure can execute spatial two-turn-one-movement motion, it has the advantages of simple structure, large turning angle, high rigidity, large bearing capacity, and high dynamic performance, and can be applied to fields such as complicated curve surface processing and motion simulation.

DETAILED DESCRIPTION OF THE INVENTION

Figure 1:
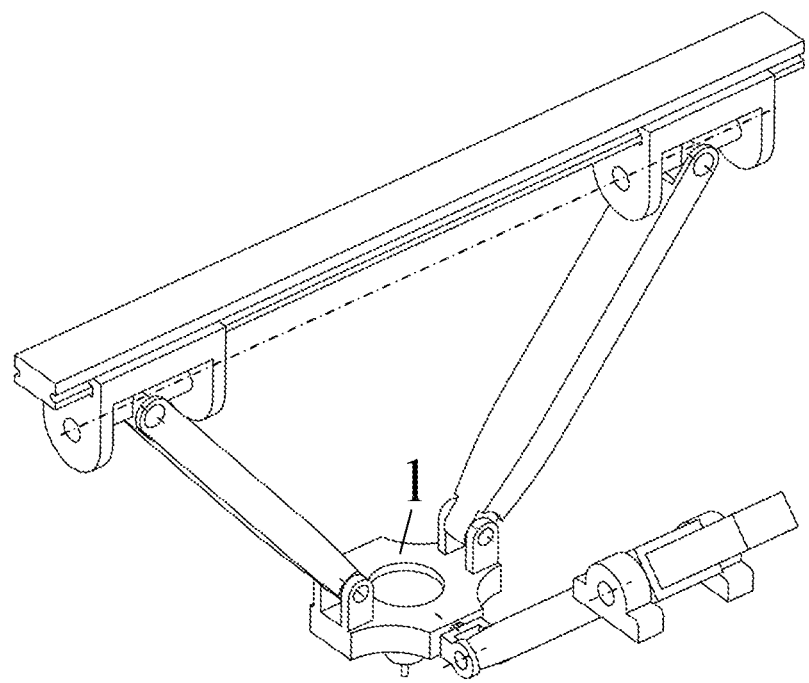
FIG. 1 is a space structural view of embodiment 1 of the present disclosure.
Figure 2:
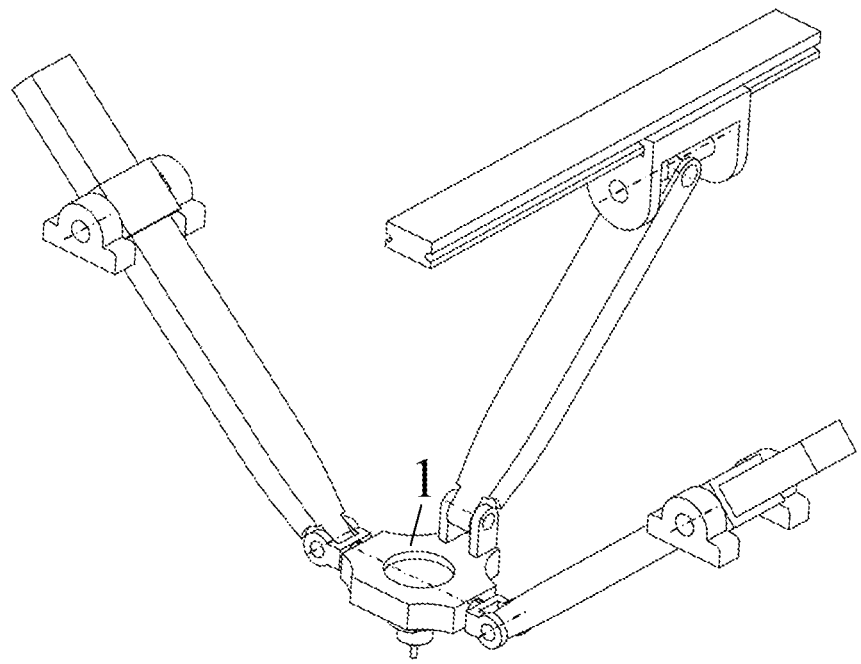
FIG. 2 is a space structural view of embodiment 2 of the present disclosure.
Figure 3:
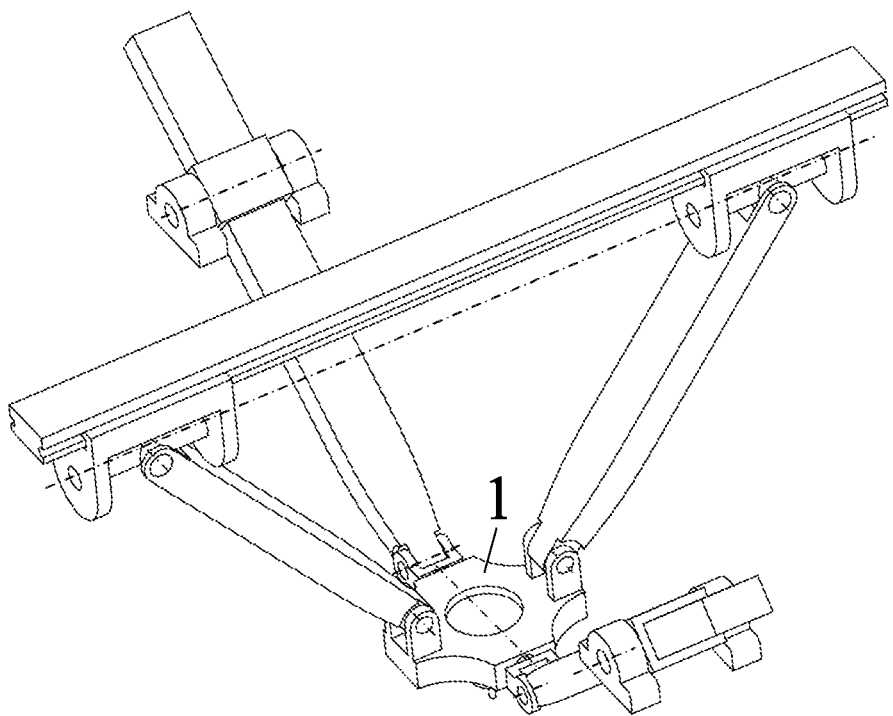
FIG. 3 is a space structural view of embodiment 3 of the present disclosure.

The present disclosure is described in further detail in conjunction with drawings attached to the specification. However, the present disclosure is not limited to the following embodiments.

Embodiment 1

As shown in FIGS. 1, 6, 7 and 8, a two-turn-one-movement parallel mechanism with a large turning angle includes a machine frame (not shown in the drawings), a movable platform 1, and one first branch and two second branches that are connected between the machine frame and the movable platform in parallel.

The first branch includes a first bearing base 11 and a second bearing base 12 (the turning shafts of the two bearing bases are coaxial), a first moving pair slider 13, a first moving pair guide rod 14 and a first universal joint 15 which are connected between the machine frame and the movable platform in turn, wherein the first bearing base and the second bearing base are installed on the machine frame, a rotating shaft 16 on the first moving pair slider is matched with the first bearing base and the second bearing base to form a machine frame turning pair, the first moving pair slider is matched with the first moving pair guide rod to form a first moving pair, and the axis of a first turning shaft of the first universal joint (namely the axis of the turning shaft, in connection with the guide rod, of the first universal joint) is parallel to the axis of the machine frame turning pair and vertical to the axis of the first moving pair (namely the moving axis of the first moving pair; the following is similar).

Each one of the second branches includes a second moving pair guide rod 21, a second moving pair slider 22, a second universal joint 23, a connecting rod 24 and a movable platform turning pair 25 that are connected between the machine frame and the movable platform in turn, wherein each one of the second moving pair sliders and each corresponding one of the second moving pair guide rails form a second moving pair, each one of the second universal joints is connected with each corresponding one of the second moving pair sliders, the axis of a first turning shaft of each one of the second universal joints is parallel to the axis of each one of the second moving pairs, and the axis of a second turning shaft of each one of the universal joints (namely the axis of the turning shaft, in connection with each corresponding one of the connecting rods, of each one of the second universal joints) is parallel to the axis of each one of the movable platform turning pairs and vertical to the axis of each one of the second moving pairs.

The axis of the first turning pair of each one of the second universal joints in the two second branches is superimposed with and parallel to the axis of the machine frame turning pair in the first branch; and the axis of each one of the movable platform turning pairs in the two second branches is parallel to the axis of the second turning shaft of the first universal joint in the first branch (namely the axis of the turning shaft, in connection with the movable platform, of the first universal joint).

In this embodiment, the driving pair is the moving pair on each one of the branches; the driving mode can be selected as ballscrews (not shown in the drawings); and when the driving pair moves, the mechanism performs the two-turn-one-movement motion, namely having three degrees of freedom.

Embodiment 2

As shown in FIGS. 2, 6, 7 and 8, a two-turn-one-movement parallel mechanism with a large turning angle includes a machine frame (not shown in the drawings), a movable platform 1, and two first branches and one second branch that are connected between the machine frame and the movable platform in parallel.

Each one of the first branches includes a first bearing base 11 and a second bearing base 12 (the turning shafts of the two bearing bases are coaxial), a first moving pair slider 13, a first moving pair guide rod 14 and a first universal joint 15 which are connected between the machine frame and the movable platform in turn, wherein the first bearing bases and the second bearing bases are installed on the machine frame, a rotating shaft 16 on each one of the first moving pair sliders is matched with each corresponding one of the first bearing bases and each corresponding one of the second bearing bases to form a machine frame turning pair, each one of the first moving pair sliders is matched with each corresponding one the first moving pair guide rods to form a first moving pair, and the axis of a first turning shaft of each one of the first universal joints (namely the axis of the turning shaft, in connection with each corresponding one of the guide rods, of each one of the first universal joints) is parallel to the axis of each corresponding one of the machine frame turning pairs and vertical to the axis of the each corresponding one of first moving pairs.

The second branch includes a second moving pair guide rod 21, a second moving pair slider 22, a second universal joint 23, a connecting rod 24 and a movable platform turning pair 25 that are connected between the machine frame and the movable platform in turn, wherein the second moving pair slider and the second moving pair guide rail form the second moving pair, the second universal joint is connected with the second moving pair slider, the axis of a first turning shaft of the second universal joint is parallel to the axis of the second moving pair, and the axis of a second turning shaft of the hook joint (namely the axis of the turning shaft, in connection with the connecting rod, of the second universal joint) is parallel to the axis of the movable platform turning pair and vertical to the axis of the second moving pair.

The axis of a second turning shaft of each one of the first universal joints (namely the axis of the turning shaft, in connection with the movable platform, of each one of the first universal joints) in the two first branches is superimposed with and parallel to the axis of the movable platform turning pair in the second branch; and the axis of a first turning pair of the second universal joint in the second branch is parallel to the axis of the machine frame turning pair in the first branch.

In this embodiment, the driving pair is the moving pair on each one of the branches; the driving mode can be selected as ballscrews (not shown in the drawings); and when the driving pair moves, the mechanism performs the two-turn-one-movement motion, namely having three degrees of freedom.

Embodiment 3

As shown in FIGS. 3, 6, 7 and 8, a two-turn-one-movement parallel mechanism with a large turning angle includes a machine frame (not shown in the drawings), a movable platform 1, and two first branches and two second branches that are connected between the machine frame and the movable platform in parallel.

Each one of the first branches includes a first bearing base 11 and a second bearing base 12 (the turning shafts of the two bearing bases are coaxial), a first moving pair slider 13, a first moving pair guide rod 14 and a first universal joint 15 which are connected between the machine frame and the movable platform in turn, wherein the first bearing bases and the second bearing bases are installed on the machine frame, a rotating shaft 16 on each one of the first moving pair sliders is matched with each corresponding one of the first bearing bases and each corresponding one of the second bearing bases to form a machine frame turning pair, each one of the first moving pair sliders is matched with each corresponding one the first moving pair guide rods to form a first moving pair, and the axis of a first turning shaft of each one of the first universal joints (namely the axis of the turning shaft, in connection with each corresponding one of the guide rods, of each one of the first universal joints) is parallel to the axis of each corresponding one of the machine frame turning pairs and vertical to the axis of the each corresponding one of first moving pairs.

Each one of the second branches includes a second moving pair guide rod 21, a second moving pair slider 22, a second universal joint 23, a connecting rod 24 and a movable platform turning pair 25 that are connected between the machine frame and the movable platform in turn, wherein each one of the second moving pair sliders and each corresponding one of the second moving pair guide rails form a second moving pair, each one of the second universal joints is connected with each corresponding one of the second moving pair sliders, the axis of a first turning shaft of each one of the second universal joints is parallel to the axis of each one of the second moving pairs, and the axis of a second turning shaft of each one of the universal joints (namely the axis of the turning shaft, in connection with each corresponding one of the connecting rods, of each one of the second universal joints) is parallel to the axis of each one of the movable platform turning pairs and vertical to the axis of each one of the second moving pairs.

The axis of the first turning pair of each one of the second universal joints in the two second branches is superimposed with and is parallel to the axis of each one of the machine frame turning pairs in the first branches; the axis of the second turning shaft of each one of the first universal joints (namely the axis of the turning shaft, in connection with the movable platform, of each one of the first universal joints) in the two first branches is superimposed with and parallel to the axis of each corresponding one of the movable platform turning pairs in the second branches.

The machine frame turning pairs of the two first branches are arranged symmetrically to the axis of each one of the second moving pairs of the two second branches.

In this embodiment, the driving pair is the moving pair on each one of the branches; the driving mode can be selected as ballscrews (not shown in the drawings); the mechanism has a redundant drive; and when the driving pair moves, the mechanism performs the two-turn-one-movement motion, namely having three degrees of freedom.

Embodiment 4

Figure 4:
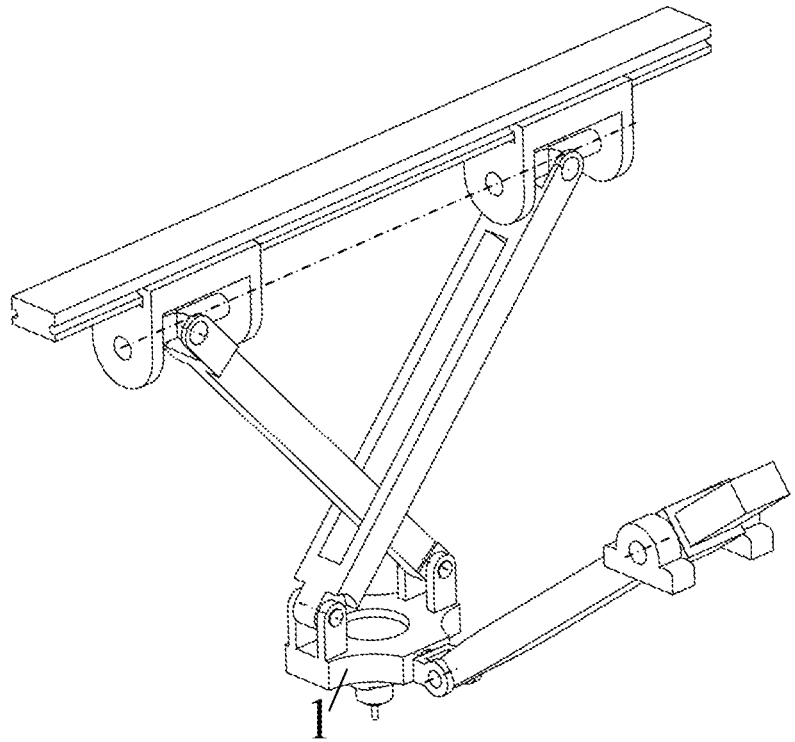
FIG. 4 is a space structural view of embodiment 4 of the present disclosure.

As shown in FIG. 4, a two-turn-one-movement parallel mechanism with a large turning angle includes a machine frame (not shown in the drawings), a movable platform 1, and one first branch and two second branches that are connected between the machine frame and the movable platform in parallel. The structure of embodiment 4 is similar to that of embodiment 1, but is different in that the connecting rod structures in the two branches in embodiment 4 are different, wherein one of the connecting rods passes through a long hole on the other one of the connecting rods, and the two branches are arranged in a crossed way.

Embodiment 5

Figure 5:
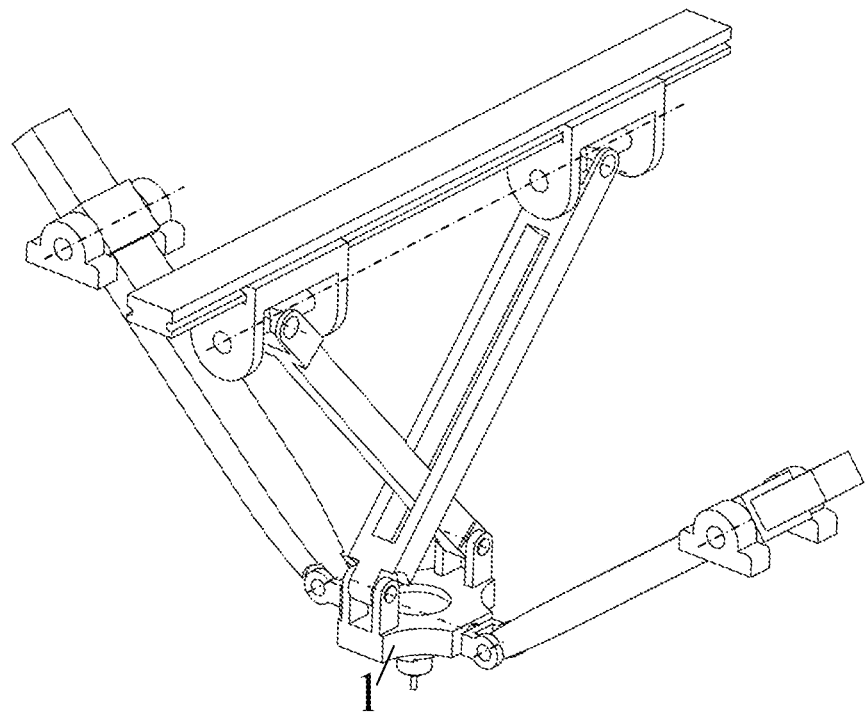
FIG. 5 is a space structural view of embodiment 5 of the present disclosure.
Figure 6:
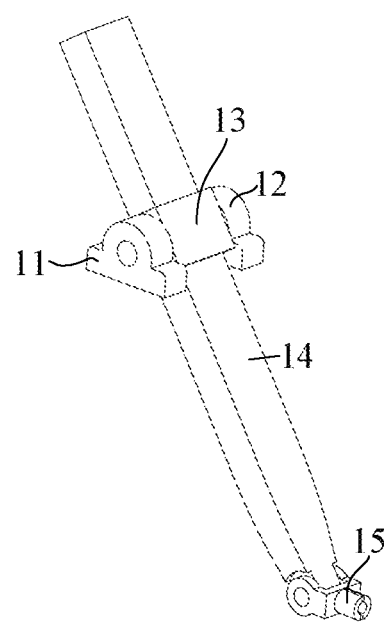
FIG. 6 is a space structural view of a first branch.
Figure 7:
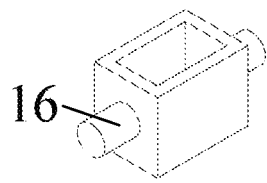
FIG. 7 is a space structural view of a first moving pair.
Figure 8:
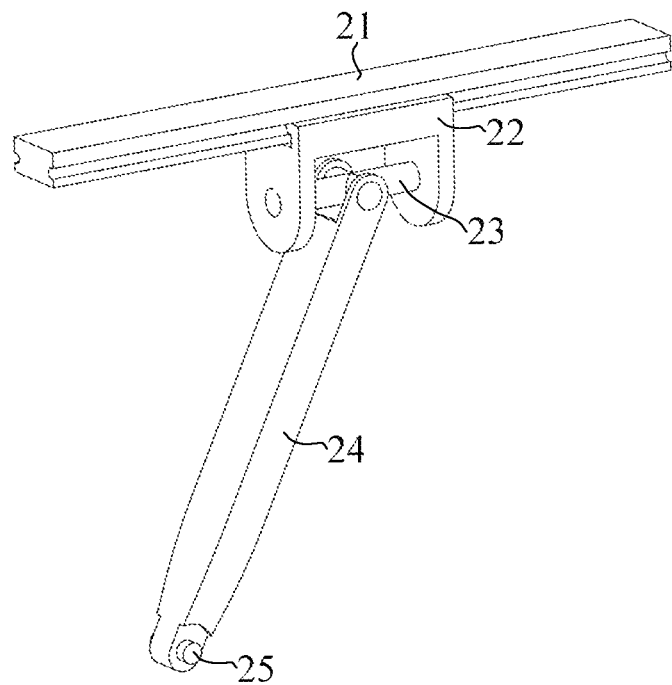
FIG. 8 is a space structural view of a second branch.

As shown in FIG. 5, a two-turn-one-movement parallel mechanism with a large turning angle includes a machine frame (not shown in the drawings), a movable platform 1, and two first branches and two second branches that are connected between the machine frame and the movable platform in parallel. The structure of embodiment 5 is similar to that of embodiment 3, but is different in that the connecting rod structures in the two branches in embodiment 5 are different, wherein one of the connecting rods passes through a long hole on the other one of the connecting rods, and the two branches are arranged in a crossed way.

What is claimed is:

1. A two-turn-one-movement parallel mechanism with a large turning angle, comprising a machine frame, a movable platform, and a first branch and two second branches that are connected between the machine frame and the movable platform in parallel, characterized in that,
    the first branch comprises a machine frame turning pair, a first moving pair slider, a first moving pair guide rod and a first universal joint that are connected between the machine frame and the movable platform in turn; the axis of a first turning shaft, in connection with the first moving pair guide rod, of the first universal joint is parallel to the axis of the machine frame turning pair and vertical to the axis of the first moving pair;
    each one of the second branches comprises a second moving pair guide rod, a second moving pair slider, a second universal joint, a connecting rod and a movable platform turning pair, wherein the axis of a first turning shaft of each one of the second hook joints is parallel to the axis of each corresponding one of the second moving pairs, the axis of a second turning shaft, in connection with each corresponding one of the connecting rods, of each one of the second universal joints is parallel to the axis of each corresponding one of the movable platform turning pairs and vertical to the axis of each corresponding one of the second moving pairs;
    the axis of the first turning pair of each one of the second universal joints in the two second branches is superimposed with and parallel to the axis of the machine frame turning pair in the first branch; and the axis of each one of the movable platform turning pairs in the two second branches is parallel to the axis of the second turning shaft of the first universal joint in the first branch.

2. The two-turn-one-movement parallel mechanism with a large turning angle according to claim 1, characterized in that the machine frame turning pair is formed through cooperation between a rotating shaft on the first moving pair slider and a first bearing base and a second bearing base.

3. A two-turn-one-movement parallel mechanism with a large turning angle, comprising a machine frame, a movable platform, and two first branches and one second branch that are connected between the machine frame and the movable platform in parallel, characterized in that,
    each one of the first branches comprises a machine frame turning pair, a first moving pair slider, a first moving pair guide rod and a first universal joint that are connected between the machine frame and the movable platform in turn; the axis of a first turning shaft, in connection with each corresponding one of the first moving pair guide rods, of each one of the first universal joints is parallel to the axis of each one of the machine frame turning pairs and vertical to the axis of each one of the first moving pairs;
    the second branch comprises a second moving pair guide rod, a second moving pair slider, a second universal joint, a connecting rod and a movable platform turning pair, wherein the axis of a first turning shaft of the second universal joint is parallel to the axis of the second moving pair, the axis of a second turning shaft, in connection with the connecting rod, of the second universal joint is parallel to the axis of the movable platform turning pair and vertical to the axis of the second moving pair;
    the axis of a second turning shaft, in connection with the movable platform, of each one of the first universal joints in the two first branches is superimposed with and parallel to the axis of the movable platform turning pair in the second branch; and the axis of a first turning pair of the second universal joint in the second branch is parallel to the axis of each one of the machine frame turning pairs in the first branch.

4. The two-turn-one-movement parallel mechanism with a large turning angle according to claim 3, characterized in that the machine frame turning pair is formed through cooperation between rotating shafts on the first moving pair slider and a first bearing base and a second bearing base.

5. A two-turn-one-movement parallel mechanism with a large turning angle, comprising a machine frame, a movable platform, and two first branches and two second branches that are connected between the machine frame and the movable platform in parallel, characterized in that,
    each one of the first branches comprises a machine frame turning pair, a first moving pair slider, a first moving pair guide rod and a first universal joint that are connected between the machine frame and the movable platform in turn; the axis of a first turning shaft, in connection with each corresponding one of the guide rods, of each one of the first universal joints is parallel to the axis of each one of the machine frame turning pairs and vertical to the axis of each one of the first moving pairs;
    each one of the second branches comprises a second moving pair guide rod, a second moving pair slider, a second universal joint, a connecting rod and a movable platform turning pair, wherein the axis of a first turning shaft, in connection with each corresponding one of the second moving pair sliders, of each one of the second universal joints is parallel to the axis of each one of the second moving pairs, the axis of a second turning shaft, in connection with each corresponding one of the connecting rods, of each one of the second universal joints is parallel to the axis of each one of the movable platform turning pairs and vertical to the axis of each one of the moving pairs;
    the axis of the first turning pair of each one of the second universal joints in the two second branches is superimposed with and is parallel to the axis of each one of the machine frame turning pairs in the first branches; the axis of each one of the second turning shafts, in connection with the movable platform, of each one of the first universal joints in the two first branches is superimposed with and parallel to the axis of each corresponding one of the movable platform turning pairs in the second branches;

and the machine frame turning pairs of the two first branches are arranged symmetric to the axis of each one of the second moving pairs of the two second branches.

6. The two-turn-one-movement parallel mechanism with a large turning angle according to claim 5, characterized in that the machine frame turning pair is formed through cooperation between rotating shafts on the first moving pair sliders and a first bearing base and a second bearing base.

7. The two-turn-one-movement parallel mechanism with a large turning angle according to claim 2, characterized in that in the two second branches, one of the connecting rods passes through a long hole on the other one of the connecting rods such that the two second branches are arranged in a crossed way; and the long hole is formed along the length direction of the correcting rod.

8. The two-turn-one-movement parallel mechanism with a large turning angle according to claim 6, characterized in that in the two second branches, one of the connecting rods passes through a long hole on the other one of the connecting rods such that the two second branches are arranged in a crossed way; and the long hole is formed along the lengthwise direction of the correcting rod.

* * * * *